(12) United States Patent
Caprioli et al.

(10) Patent No.: US 8,151,084 B2
(45) Date of Patent: Apr. 3, 2012

(54) USING ADDRESS AND NON-ADDRESS INFORMATION FOR IMPROVED INDEX GENERATION FOR CACHE MEMORIES

(75) Inventors: Paul Caprioli, Santa Clara, CA (US); Martin Karlsson, San Francisco, CA (US); Shailender Chaudhry, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 531 days.

(21) Appl. No.: 12/018,407

(22) Filed: Jan. 23, 2008

(65) Prior Publication Data
US 2009/0187727 A1    Jul. 23, 2009

(51) Int. Cl.
*G06F 12/10* (2006.01)

(52) U.S. Cl. ........ 711/205; 711/118; 711/122; 711/137; 711/221

(58) Field of Classification Search .................. 711/205, 711/118, 122, 137, 221
See application file for complete search history.

(56) References Cited

U.S. PATENT DOCUMENTS
2006/0236074 A1 * 10/2006 Williamson et al. .......... 711/216
* cited by examiner

*Primary Examiner* — Jae Yu
(74) *Attorney, Agent, or Firm* — Park, Vaughan, Fleming & Dowler LLP; Anthony Jones

(57) ABSTRACT

Embodiments of the present invention provide a system that generates an index for a cache memory. The system starts by receiving a request to access the cache memory, wherein the request includes address information. The system then obtains non-address information associated with the request. Next, the system generates the index using the address information and the non-address information. The system then uses the index to fulfill access the cache memory.

22 Claims, 3 Drawing Sheets

USING ADDRESS AND NON-ADDRESS INFORMATION FOR IMPROVED INDEX GENERATION FOR CACHE MEMORIES

BACKGROUND

1. Field of the Invention

Embodiments of the present invention generally relate to cache memories. More specifically, embodiments of the present invention relate to techniques for using non-address information to generate indices to access entries in a cache memory.

2. Related Art

Nearly all computer systems include a memory structure which stores a number of entries that is smaller than a set of items that the memory structure is designed to store. For example, many computer systems include a cache memory that provides fast local storage for a small amount of data from a slower main memory. Caches typically store far fewer entries than the number of memory locations in the main memory. Consequently, each entry in a cache must be available for storing data from a number of different locations in main memory. Translation lookaside buffers (TLBs) are another example of such a memory structure.

In order to store data items in these memory structures, some systems generate indices for the data items and then use the generated indices to determine an entry in the memory structure where the data item should be located. For example, during a cache access, the address of the cache line is used to generate an index which the system uses to determine an entry in the cache where the cache line should be located. Similarly, for a TLB lookup operation, a virtual address is used to generate an index in the TLB where a corresponding physical address should be stored.

Unfortunately, using addresses to generate indices can lead to unbalanced utilization of entries in these types of memory structures. For example, more than one thread may be accessing the same range of addresses in a cache and will consequently be generating the same indices. The repeated generation of the same indices can lead to a large number of accesses to the same locations in the cache, which can cause the threads to interfere with each other and thereby adversely affect performance.

Hence, what is needed is a cache memory without the above-described problem.

SUMMARY

Embodiments of the present invention provide a system that generates an index for a cache memory. The system starts by receiving a request to access the cache memory, wherein the request includes address information. The system then obtains non-address information associated with the request. Next, the system generates the index using the address information and the non-address information. The system then uses the index to access the cache memory.

In some embodiments, receiving the request involves receiving one of a request for: a data-cache access; an instruction-cache access; a TLB write; a TLB lookup; or a way prediction.

In some embodiments, obtaining the non-address information involves obtaining information from an instruction that caused the request, wherein the non-address information includes at least one of: (1) an instruction type or opcode; (2) a destination register address; (3) a source register address; (4) an immediate value; or (5) control information.

In some embodiments, obtaining the non-address information involves obtaining information from the computer system, including at least one of: a parameter from the computer system or a derived parameter computed from one or more parameters from the computer system.

In some embodiments, generating the index involves prepending, appending, interleaving, or otherwise combining some or all of the address information to some or all of the non-address information.

In some embodiments, generating the index involves logically combining some or all of the address information with some or all of the non-address information.

In some embodiments, logically combining the address information with the non-address information involves computing a bitwise XOR of some or all of the address information with some or all of the non-address information.

In some embodiments, generating the index involves computing the index using a function, wherein the inputs to the function include some or all of the address information and some or all of the non-address information.

Table 1 describes fields in a set of exemplary instruction formats in accordance with embodiments of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Computer System

Figure 1A:
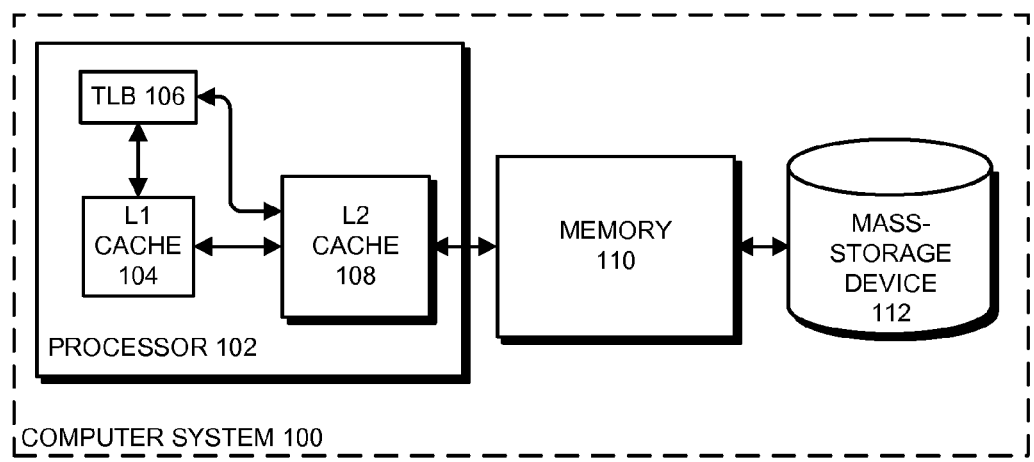
FIG. 1A presents a block diagram of a computer system in accordance with embodiments of the present invention.

FIG. 1A presents a block diagram of a computer system 100 in accordance with embodiments of the present invention. Computer system includes processor 102, memory 110, and mass-storage device 112. Processor 102 includes L1 cache 104, TLB 106, and L2 cache 108. Processor 102 is a general-purpose central processing unit (CPU) that performs computational operations. For example, processor 102 can be a microprocessor, a controller, or a computational engine in a device.

Mass-storage device 112, memory 110, L2 cache 108, and L1 cache 104 form a memory hierarchy that stores data and instructions for processor 102. Generally, mass-storage device 112 is a high-capacity memory, such as a disk drive or a large flash memory, with a large access time, while L1 cache 104, L2 cache 108, and memory 110 are smaller, faster memories that store copies of frequently used data. Memory 110 is typically a dynamic random access memory (DRAM) structure that is larger than L1 cache 104 and L2 cache 108, whereas L1 cache 104 and L2 cache 108 are typically comprised of static random access memory (SRAM). In some embodiments of the present invention, L2 cache 108, memory 110, and mass-storage device 112 are shared between one or more processors in computer system 100. Such memory structures are well-known in the art and are therefore not described in more detail.

In some embodiments of the present invention, the caches are set-associative. In these embodiments, entries in each cache are logically divided into a number of "ways." Each way includes a group of entries that can be used to store data. When data is stored in the cache, the system can store the data in a corresponding entry in an available "way" in an associated set. Set-associative caches are known in the art and are therefore not described in more detail.

TLB 106 is a translation lookaside buffer (TLB). Generally, a TLB is a cache that includes a number of entries for page table entries, wherein each entry maps a virtual address to a physical address. In embodiments of the present invention, the TLB is a circuit structure that enables fast lookups, such as a content-addressable memory (CAM). During operation, processor 102 looks up a physical address for a page of memory in the TLB(s). If the requested virtual address is present in the TLB, the search returns a physical address for the page, after which the physical address can be used to access the desired data. If the requested address is not in the TLB, the virtual-address-to-physical-address translation retrieves the physical address from a page table (which is resident in main memory and is hence slower to access).

Figure 1B:
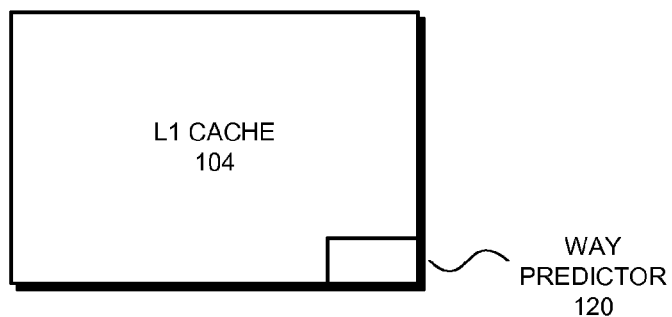
FIG. 1B presents a block diagram of a cache in accordance with embodiments of the present invention.

FIG. 1B presents a block diagram of L1 cache 104 in accordance with embodiments of the present invention. As shown in FIG. 1B, L1 cache 104 includes way predictor 120. Way predictor 120 is used to predict which "way" a cache line is stored in when making a cache line access.

In embodiments of the present invention, one or more hardware structures, such as processor 102, a cache controller in L1 cache 104, or a controller in TLB 106, include circuit structures that are configured to generate indices and use the generated indices to perform subsequent operations. For example, these circuit structures can include: (1) a receiving mechanism configured to receive a request to access a cache memory, wherein the request includes address information; (2) an obtaining mechanism configured to obtain non-address information associated with the request; and (3) a generation mechanism configured to generate the index using the address information and the non-address information. In these embodiments, one or more of these hardware structures include circuit structures that are configured to use the generated index when performing a subsequent operation, such as a TLB lookup or a cache access.

For example, these hardware structures can include an accessing mechanism configured to use the index to access the cache memory.

Although we use specific structures to describe computer system 100, in alternative embodiments different components can be present in computer system 100. For example, computer system 100 can include video cards, network cards, optical drives, and/or other peripheral devices that are coupled to the one or more of the processors using a bus, a network, or another suitable communication channel.

Instruction Format

Figure 2A:
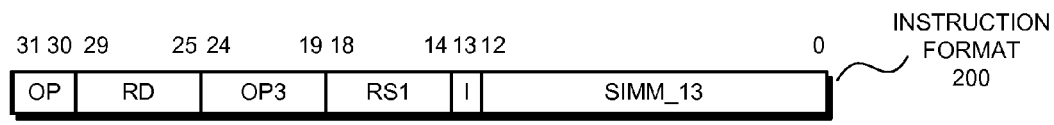
FIG. 2A presents an exemplary instruction format in accordance with embodiments of the present invention.
Figure 2B:
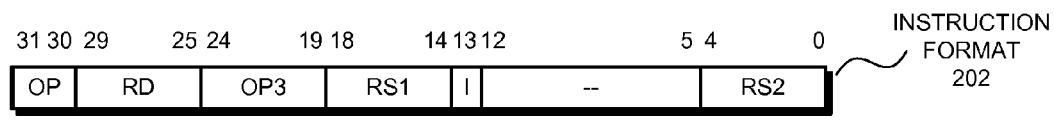
FIG. 2B presents an exemplary instruction format in accordance with embodiments of the present invention.
Figure 2C:
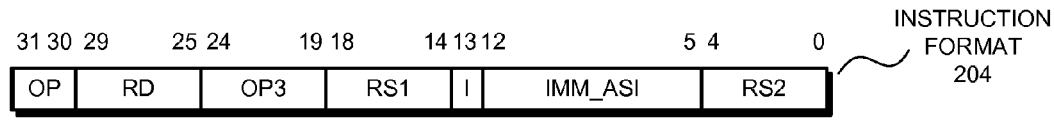
FIG. 2C presents an exemplary instruction format in accordance with embodiments of the present invention.

FIGS. 2A-2C present exemplary instruction formats 200-204 in accordance with embodiments of the present invention. The instruction formats are examples of some of the instruction formats used in the SPARC® Architecture from SPARC International, Inc. of Santa Clara, Calif., USA. Note that although we use SPARC instructions in the following description, embodiments of the present invention work with other architectures and instruction formats using the same principles. (Note further that in the following description of the instruction formats, we have simplified the description of the fields for clarity. For a complete description, see David Weaver and Tom Germond, *The SPARC Architecture Manual*, version 9, pp. 63-88, PTR Prentice Hall, Englewood Cliffs, N.J.)

Each instruction format 200-204 includes 32 bits, which are logically divided into a number of fields. For example, instruction format 200 is logically divided into 6 fields, while instruction format 204 is logically divided into 7 fields. In instruction formats 200-204, the fields indicate the following:

TABLE 1

Instruction Fields

| | |
|---|---|
| OP | An encoded portion of the opcode for the instruction. |
| RD | An address for a destination register for the instruction. |
| OP3 | An encoded portion of the opcode for the instruction. |
| RS1-RS2 | Address(es) for the source register(s) for the instruction. |
| SIMM_13 | An immediate value that is sign-extended to 64 bits and used as the second operand for a load/store instruction when i = 1. |
| I | An indicator bit that is used to select the second operand. If i = 0, r[rs2] is selected as the operand. If i = 1, simm_13, sign-extended to 64 bits, is selected as the operand. |
| IMM_ASI | An address space identifier for instructions that access an alternate address space. |

Generating Indices

Embodiments of the present invention generate and use indices for many different types of operations. For example, these embodiments can use indices for determining a location in a memory structure, performing a lookup in a lookup table, predicting a way during a cache line access, accessing a register file, determining a next instruction to be executed, determining a computer system resource to use from a set of resources, or for other operations.

Embodiments of the present invention use a combination of address information and non-address information (or non-address information alone) in a binary format when generating an index. By using non-address information when generating an index, embodiments of the present invention can improve the distribution of the generated indices. For example, if indices are generated using only an address, different threads using similar addresses can repeatedly generate the same indices, which can lead to conflicts and suboptimal performance. However, if non-address information (e.g., a thread ID or a processor register ID) is used along with the address when generating the indices, the indices can be more evenly distributed among the memory locations in a given memory structure.

In some embodiments of the present invention, the non-address information is gathered from the instruction that caused the index to be generated (e.g., the load instruction or the lookup instruction). As described above, the non-address information in the instruction can include the encoded portions of the opcode, register addresses, immediate values, ASI values, or other information, depending on the type of instruction.

On the other hand, some embodiments of the present invention use other non-address information (i.e., non-instruction, non-address information). For example, the non-address information can be gathered from processor 102, L1 cache 104, L2 cache 108, or from another source in computer system 100. This information can include, but is not limited to, a program counter, a stack pointer address, a cache ID or miss rate, a TLB ID or hit rate, a bus ID or data transfer rate, a detected parameter from the computer system (e.g., temperature measurements, buffer overflow warnings, the number of instructions executed by a thread, the number of loads from a cache, etc.), or a parameter derived from one or more computer system parameters (e.g., cycles per instruction).

Some embodiments of the present invention generate indices by logically combining some or all of the address information with some or all of at least one piece of non-address information. For example, the system may logically XOR bits [14:22] of a 32-bit address with a 5-bit register address (sign-extended to 9 bits) to generate an index. Alternatively, the system may logically AND bits [0:8] from an address with the least significant 9 bits of a 13-bit immediate value to generate an index. On the other hand, the system may logically XOR a 5-bit thread ID or a register ID with bits [10:14] of a 32-bit address and then AND the generated value with a program counter. Note that although we present these logical combinations as examples, many other logical combinations will be apparent to those of ordinary skill in the art.

Some embodiments of the present invention use non-address information and/or address information as inputs to a function that generates indices. For example, these embodiments can use address information and non-address information as inputs to a hashing function or a mathematical function that generates an index.

Some embodiments use one or more subsections of the non-address information and/or one or more subsections of the address information when generating indices. For example, assuming that an immediate value is 13 bits long, only some of the bits (e.g., 8 bits) may be used.

Some embodiments of the present invention prepend, append, interleave, or otherwise combine some or all of the non-address information with some or all of the address information. For example, assuming a 10-bit index is to be generated from a 32-bit cache line address and a 5-bit register address, bits [5:9] the index can be set equal to the register address, while bits [0:4] are set equal to bits [0:4] of the cache line address.

Along with some existing systems, embodiments of the present invention can use address information alone to generate an index. For example, given an address that is 64 bits long, these embodiments may use a subsection of the address (e.g., bits [14:22] of the address) when generating the index. On the other hand, these embodiments may use two or more sub-sections of the address when generating the index. For example, these embodiments may generate a 9-bit index by prepending bits [0:8] to bits [14:22] from a given address. Alternatively, these embodiments may use more complex hashing functions that use some or all of the address information to generate an index for the TLB entry.

Some embodiments of the present invention initially use address information alone to generate indices, but switch modes to use both address and non-address information during the generation of indices. These embodiments can switch modes upon determining that the system has encountered a condition for which the use of both address and non-address information during the generation of indices is beneficial. For example, if multiple threads are repeatedly using similar addresses to generate indices, thereby repeatedly generating the same indices, these embodiments can switch to using both address and non-address information to generate indices. These embodiments can also switch modes from using both address and non-address information to using only address information.

In the following paragraphs, we describe the generation of indices during a TLB write or lookup, a cache access, and a way prediction. Although these operations are presented as examples of index generation in embodiments of the present invention, indices are generated using similar techniques for other operations.

TLB Writes or Lookups

In embodiments of the present invention, a TLB write involves writing the physical address of a page of memory that maps to a corresponding virtual address for the page of memory to an entry in the TLB, thereby providing a physical-address-to-virtual-address mapping for the set of virtual addresses. On the other hand, a TLB lookup involves determining if the higher-order bits of a physical address corresponding to a given virtual address are stored in an entry in the TLB.

During a TLB write or TLB lookup, embodiments of the present invention generate an index that specifies the entry in the TLB that should contain a virtual-address-to-physical-address mapping for a given virtual address. When generating the index, these embodiments combine non-address information with the virtual address to generate the index. Generating the index using the virtual address and the non-address information can involve one or more of: (1) performing a logical operation such as a bit-wise XOR or AND of some or all of the virtual address information and some or all of the non-address information; (2) using the address and non-address information as inputs to a hash function; (3) using the address and non-address information as inputs to a mathematical function; (4) prepending, appending, interleaving, or otherwise combining some or all of the address information with some or all of the non-address information; (5) performing another operation or combination of operations using the address and non-address information as inputs. For example, some embodiments combine a register ID (obtained from the instruction that generated the TLB write or lookup) with the virtual address to generate the index in the TLB.

Cache Accesses

Embodiments of the present invention support a number of different types of cache accesses for performing operations on cache lines. For example, these cache accesses include, but are not limited to, loads, stores, prefetches, load/store unsigned bytes, swaps, and compare and swaps. These embodiments use indices differently during cache accesses, depending on the type of cache access. For example, some embodiments generate an index for determining the set in which a cache line is located.

Embodiments of the present invention combine address and non-address information to generate indices for cache accesses. For example, these embodiments can combine a cache line address with a thread ID or a register ID (i.e., the processor register where the address for the cache line access is stored) to generate the index.

Way Prediction

In some embodiments of the present invention, when accessing a cache line, the system first computes a prediction of the "way" in the cache where the cache line is located. The system then accesses the predicted way to determine if the cache line is in that way. If the cache line is in the predicted way, the system saves access time and avoids an unnecessary way access.

Figure 3:
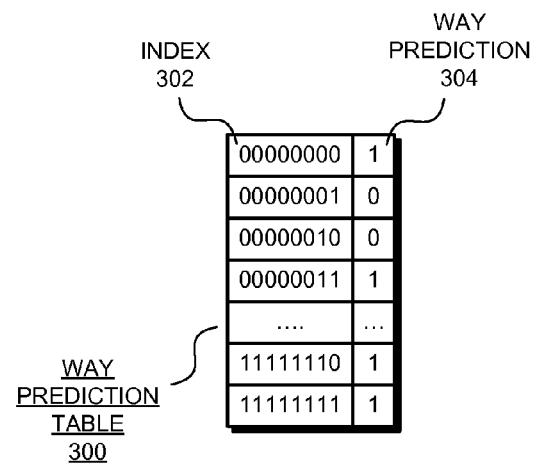
FIG. 3 presents a block diagram of a way-prediction table in accordance with embodiments of the present invention.

In some embodiments of the present invention, computing the prediction of the way involves looking up a way prediction 304 in a way-prediction table 300. FIG. 3 presents a block diagram of a way-prediction table 300 in accordance with embodiments of the present invention. Way-prediction table 300 includes a number of indices 302 and corresponding way predictions 304.

When computing a way prediction 304, embodiments of the present invention generate an index 302 and use the index 302 to look up a corresponding way prediction 304. These embodiments use address and non-address information to generate index 302. For example, assuming a way-prediction table with 256 entries, these embodiments can use 8 bits of address information (e.g., bits [0:7] or bits [20:27] of the cache line address) along with the address of the source register that contains the cache line address (i.e., the processor register where the address for the cache line access is stored) to generate the index.

Generating an Index

Figure 4:
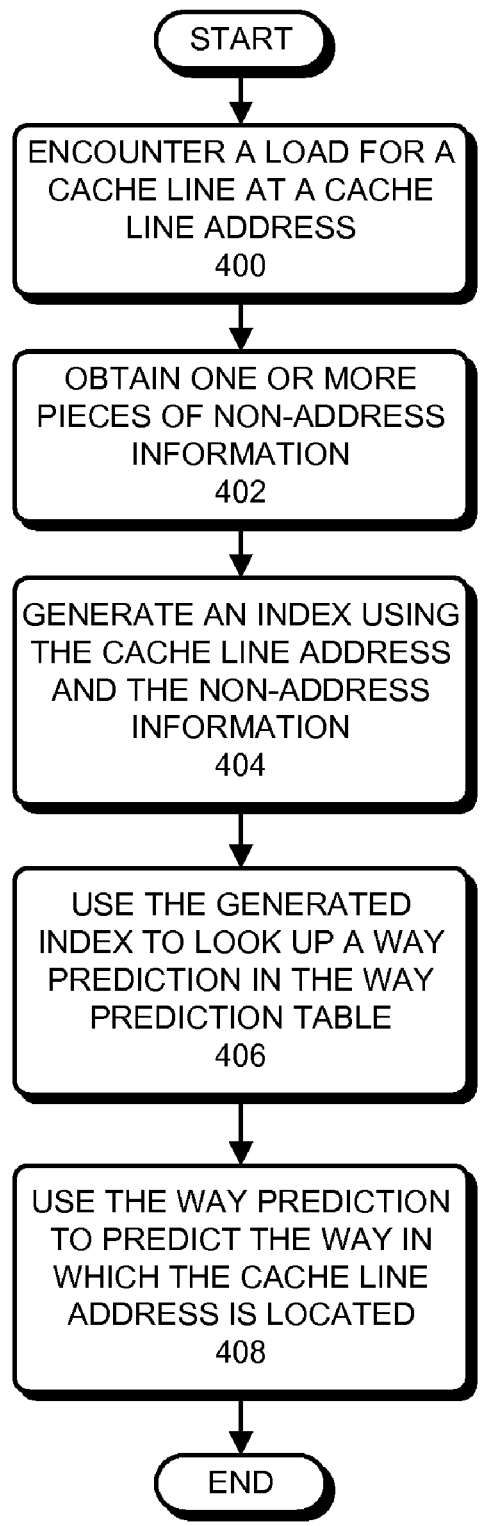
FIG. 4 presents a flowchart illustrating the process of generating an index in accordance with embodiments of the present invention.

FIG. 4 presents a flowchart illustrating the process of generating an index in accordance with embodiments of the present invention. In FIG. 4, the index is generated for a cache way prediction.

The process starts when a system encounters a load for a cache line which is directed to a cache line address (step 400). The system then obtains one or more pieces of non-address information for the load (step 402). For example, the system can determine the register address where the address for the load is stored on a processor, a location of a stack pointer, an execution thread ID (i.e., the identity of the thread for which the cache line is being loaded), or other non-address information.

Next, the system generates an index using the address of the load and the one or more pieces of non-address information (step 404). For example, the system can generate the index by logically combining the address information with the non-address information.

The system then uses the generated index 302 to look up a way prediction 304 in way-prediction table 300 (step 406). Next, the system uses the way prediction 304 to predict the way in which the cache line address is located (step 408).

Note that although we use a way prediction as an example of generating an index, indices can be generated in a similar way for other types of operations. For example, some embodiments generate an index when receiving a request to access a memory structure such as a cache, a TLB, or a lookup table. Similarly, some embodiments generate an index when receiving a request to access a register file, determine a next instruction for execution, determine a computer system resource to use from a set of resources, or for other operations.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for generating an index for a cache memory, comprising:
receiving a request to access a cache memory, wherein the request includes address information;
obtaining non-address information associated with the request, wherein obtaining the non-address information comprises at least one of:
    obtaining information from an instruction that caused the request, or
    obtaining a parameter from at least one component in a computer system in which the cache memory is located;
generating the index using the address information and the non-address information;
upon detecting a first switching condition while generating indices using address information and non-address information, switching from generating indices using address information and non-address information to generating indices using only address information;
upon detecting a second switching condition while generating indices using only address information, switching from generating indices using address information and non-address information to generating indices using only address information; and
using the index to access the cache memory.

2. The method of claim 1, wherein receiving the request involves receiving one of a request for: a data-cache access; an instruction-cache access; a TLB write; a TLB lookup; or a way prediction.

3. The method of claim 1, wherein the information from the instruction that caused the request comprises at least one of:
an instruction type or opcode;
a destination register address;
a source register address;
an immediate value; or
control information.

4. The method of claim 1, wherein the parameter from the at least one component in the computer system comprises at least one of:
a parameter from a processor, a cache, or another component in the computer system; or
a derived parameter computed from one or more parameters from at least one of the processor, the cache, or another component in the computer system.

5. The method of claim 1, wherein generating the index involves prepending, appending, interleaving, or combining some or all of the address information to some or all of the non-address information.

6. The method of claim 1, wherein generating the index involves logically combining some or all of the address information with some or all of the non-address information.

7. The method of claim 6, wherein logically combining the address information with the non-address information involves computing a bitwise XOR of some or all of the address information with some or all of the non-address information.

8. The method of claim 1, wherein generating the index involves computing the index using a function, wherein the inputs to the function include some or all of the address information and some or all of the non-address information.

9. An apparatus for generating an index for a cache memory, comprising:
a receiving mechanism configured to receive a request to access a cache memory, wherein the request includes address information;
an obtaining mechanism configured to obtain non-address information associated with the request, wherein obtaining the non-address information comprises at least one of:
    obtaining information from an instruction that caused the request, or
    obtaining a parameter from at least one component in a computer system in which the cache memory is located;

a generation mechanism configured to generate the index using the address information and the non-address information; and an accessing mechanism configured to use the index to access the cache memory, wherein, upon detecting a first switching condition while generating indices using address information and non-address information, the generation mechanism is configured to switch from generating indices using address information and non-address information to generating indices using only address information; and wherein, upon detecting a second switching condition while generating indices using only address information, the generation mechanism is configured to switch from generating indices using address information and non-address information to generating indices using only address information.

10. The apparatus of claim 9, wherein the receiving mechanism is configured to receive one of a request for: a data-cache access; an instruction-cache access; a TLB write; a TLB lookup; or a way prediction.

11. The apparatus of claim 9, wherein the information from the instruction that caused the request comprises at least one of:
an instruction type or opcode;
a destination register address;
a source register address;
an immediate value; or
control information.

12. The apparatus of claim 9, wherein the parameter from the at least one component in the computer system comprises at least one of:
a parameter from a processor, a cache, or another component in the computer system; or
a derived parameter computed from one or more parameters from at least one of the processor, the cache, or another component in the computer system.

13. The apparatus of claim 9, wherein when generating the index, the generation mechanism is configured to prepend, append, interleave, or combine some or all of the address information to some or all of the non-address information.

14. The apparatus of claim 9, wherein when generating the index, the generation mechanism is configured to logically combine some or all of the address information with some or all of the non-address information.

15. The apparatus of claim 14, wherein when logically combining the address information with the non-address information, the generation mechanism is configured to compute a bitwise XOR of some or all of the address information with some or all of the non-address information.

16. The apparatus of claim 9, wherein when generating the index, the generation mechanism is configured to compute the index using a function, wherein the inputs to the function include some or all of the address information and some or all of the non-address information.

17. A computer system for generating an index for a cache memory, comprising:
a processor coupled to the cache memory, wherein the cache memory stores data for the processor;
a receiving mechanism configured to receive a request to access a cache memory, wherein the request includes address information;
an obtaining mechanism configured to obtain non-address information associated with the request, wherein obtaining the non-address information comprises at least one of:
obtaining information from an instruction that caused the request, or
obtaining a parameter from at least one component in a computer system in which the cache memory is located;
a generation mechanism configured to generate the index using the address information and the non-address information; and
an accessing mechanism configured to use the index to access the cache memory,
wherein, upon detecting a first switching condition while generating indices using address information and non-address information, the generation mechanism is configured to switch from generating indices using address information and non-address information to generating indices using only address information; and
wherein, upon detecting a second switching condition while generating indices using only address information, the generation mechanism is configured to switch from generating indices using address information and non-address information to generating indices using only address information.

18. The computer system of claim 17, wherein the information from the instruction that caused the request comprises at least one of:
an instruction type or opcode;
a destination register address;
a source register address;
an immediate value; or
control information.

19. The computer system of claim 17, wherein the parameter from the at least one component in the computer system comprises at least one of:
a parameter from a processor, a cache, or another component in the computer system; or
a derived parameter computed from one or more parameters from at least one of the processor, the cache, or another component in the computer system.

20. The computer system of claim 17, wherein when generating the index, the generation mechanism is configured to prepend, append, interleave, or combine some or all of the address information to some or all of the non-address information.

21. The computer system of claim 17, wherein when generating the index, the generation mechanism is configured to logically combine some or all of the address information with some or all of the non-address information.

22. The computer system of claim 17, wherein when generating the index, the generation mechanism is configured to compute the index using a function, wherein the inputs to the function include some or all of the address information and some or all of the non-address information.

* * * * *